US008270904B2

(12) United States Patent
Srinivasan et al.

(10) Patent No.: US 8,270,904 B2
(45) Date of Patent: Sep. 18, 2012

(54) COOPERATIVE LOCAL AND WIDE AREA RADIO BROADCASTING

(76) Inventors: Sudharshan Srinivasan, Fremont, CA (US); Jai Kumar, Cupertino, CA (US); Kothandraman Ramchandran, Fremont, CA (US)

( * ) Notice: Subject to any disclaimer, the term of this patent is extended or adjusted under 35 U.S.C. 154(b) by 814 days.

(21) Appl. No.: 12/386,221

(22) Filed: Apr. 15, 2009

(65) Prior Publication Data

US 2010/0267406 A1 Oct. 21, 2010

(51) Int. Cl.
*H04B 7/00* (2006.01)

(52) U.S. Cl. .................................... 455/41.2; 455/556.1

(58) Field of Classification Search ............... 455/569.1, 455/569.2, 575.9, 103, 93
See application file for complete search history.

(56) References Cited

U.S. PATENT DOCUMENTS

| | | | | |
|---|---|---|---|---|
| 5,867,794 | A * | 2/1999 | Hayes et al. | 455/557 |
| 6,782,239 | B2 * | 8/2004 | Johnson et al. | 455/42 |
| 6,928,308 | B2 * | 8/2005 | Wang et al. | 455/569.2 |
| 2002/0184037 | A1 * | 12/2002 | Patsiokas et al. | 704/500 |

* cited by examiner

*Primary Examiner* — Tu X Nguyen

(57) ABSTRACT

A method to transmit local area radio broadcast signals (38) that is coupled to wide area radio broadcast signals (39) is described. Local area radio broadcasting is used to transmit audio content from personal audio players into the audio of an automobile. Local area radio broadcast signals (38) are coupled to wide area radio broadcast signals (39) using time based or algorithm based time slot allocation methods. A personal audio player such as a smartphone (32) or a music player is enabled with a local area broadcast radio signal transmitter (53) that transmits radio signals into a desired channel (35) which may be occupied by a wide area transmitter (68). The local area transmission may be mutually exclusive or overlapping with wide area transmission. When overlapping, signal cancellation techniques may be used such that a signature signal from wide area broadcast station may be cancelled by local area broadcast.

10 Claims, 8 Drawing Sheets

CO-OPERATIVE RADIO BROADCAST SYSTEM

CO-OPERATIVE RADIO BROADCAST SYSTEM WITH SIGNATURE SINGALS

DETAILS OF SMARTPHONE MOBILE DEVICE USED IN
CO-OPERATIVE RADIO BROADCAST SYSTEM

DETAILS OF BROADCAST STATION USED IN CO-OPERATIVE RADIO BROADCAST SYSTEM

CO-OPERATIVE RADIO BROADCAST METHOD AT MOBILE DEVICE

CO-OPERATIVE RADIO BROADCAST METHOD AT BROADCAST STATION

COOPERATIVE LOCAL AND WIDE AREA RADIO BROADCASTING

CROSS-REFERENCE TO RELATED APPLICATIONS

Not applicable

FEDERALLY SPONSORED RESEARCH

Not applicable

SEQUENCE LISTING OR PROGRAM

Not applicable

BACKGROUND OF THE INVENTION

1. Field of Invention

The present invention generally relates to radio broadcasting methods and specifically to radio broadcasting methods that involve both local and wide area radio broadcasting.

2. Prior Art US Patent

Radio receivers receive broadcast radio signals and convert them into audio signals to be heard by listeners. These broadcast radio signals are usually from broadcast radio stations that transmit radio signals to a wide area of population. This system has served well until now as broadcast radio stations distribute desired content over the air based on demographics of population.

But with advent of internet and mobile devices, listeners are seeking highly customized content tailored to individual tastes and expect such content to be available on demand. In particular listeners desire to hear personalized audio content while in an automobile. Although personalized audio content can be heard using headphones associated with personal audio players, it is impractical and often not recommended for use while driving due to safety concerns.

Hence there is a need for a personalized audio system that can leverage a high fidelity audio system of an automobile. Currently there are several solutions addressing this need.

One solution is to connect a personalized audio player into a cassette player of the automobile using a cassette adapter. But this solution does not address all automobiles as most new automobiles do not have a cassette player.

Another solution is to use a local area radio transmitter along with a personal audio player. Local area radio transmitters transmit radio waves to reach a small local distance. Such local area radio transmitters are available in the market and are marketed as Frequency Modulation (FM) transmitters.

Although this can be a good solution to solve the need for personalized audio content in an automobile, it suffers from various problems. Local area radio transmitters have to transmit at the same frequency as wide area radio transmitters. The signal strength of a wide area radio transmitter is usually far greater than the signal strength of a local area radio transmitter. Hence if a user transmits using a local area radio transmitter into a channel that also has signals from a wide area radio transmitter, there will be a collision between the two signals. This will give rise to intermittent noise or even complete suppression of local area radio transmitter signals. Hence a user may be prompted to change channels and scan for another channel that may have less collision.

But since most broadcast radio channels use licensed spectrum, it is very rare to find a radio channel that is unused across cities. Hence if a user is traveling in an automobile across cities, the chance that a particular channel will remain collision free for prolonged periods of time is slim.

Hence there is a need for a system that enables personalized audio content delivery in an automobile that does not suffer from the above mentioned problems and provides a clear collision free personalized audio listening experience.

Currently there are no known prior art methods that offer a solution to this problem.

Following paragraphs in current section describe relevant prior arts in this field.

Prior art U.S. Pat. No. 7,110,720 describes a system to play on demand audio content from internet using a device capable of receiving internet audio content and transmitting the audio content using local FM radio transmitting. Although this prior art addresses part of the need to provide on demand audio content, it does not address the problems that local FM radio transmitting will encounter as described above. Hence this prior art does not address the need for a clear collision free personalized audio listening experience in an automobile.

Prior art U.S. Pat. No. 6,928,308 describes a accessory device that works with a mobile phone to enable audio content in the mobile phone to be heard using a local area FM transmitter. This prior art enables the local area FM transmitter to automatically detect which channel a FM receiver is tuned to, so that the FM transmitter can automatically tune to the same channel, thereby reducing an extra step for a user to setup the appropriate channel in the local area FM transmitter. But this does not address the need for a clear collision free personalized audio listening experience in an automobile. The methods suggested by this prior art will also suffer from the collision problems as described above.

There are FM transmitters in the market that will automatically scan for the best possible channel to use for transmission, but such scans may yield poor results in a densely populated urban area where most channels are taken. Also, if an automobile is crossing over broadcast areas, a seemingly clear channel in one area may be occupied in a neighboring area and hence prompting for another channel scan and corresponding channel change in the receiver. Hence this solution does not provide an uninterrupted service and does not address the need for a clear collision free personalized audio listening experience in an automobile.

As can be seen from above, all known prior arts suffer from some limitations in offering a solution to address the need for a clear collision free personalized audio listening experience in an automobile.

3. Objects and Advantages

Accordingly, several objects and advantages of the present invention are:

a) to provide clear collision free personalized audio listening experience in an automobile;

b) to provide a method that enables radio channel owners to maintain advertisement revenue while providing for personalized audio listening experience; and c) to provide for additional revenue opportunities to radio channel owners while providing for a personalized audio listening experience.

SUMMARY

In accordance with present invention a clear collision free personalized audio listening experience is provided in an automobile.

This is achieved by providing a system that enables synchronized and cooperative radio transmission between local and wide area radio transmitters, both transmitting at the same radio frequency.

Hence a device and corresponding method are described such that this device enables local area transmission of audio content using radio broadcast frequencies such that the local area transmission is controlled and synchronized to transmissions from wide area radio transmitters using the same frequency.

This is achieved by freeing up a radio channel from continuous wide area broadcast transmission and then sharing this free radio channel between a local area radio transmitter and wide area radio transmitter.

The amount of time allocated to each transmitter is configurable based on business metrics. There can be number of algorithms used to achieve the synchronization and corresponding time allocation between local and wide area radio transmitters.

In one of the embodiments, a local area radio transmitter is synchronized with a wide area radio transmitter such that a wide area radio transmitter will transmit only during prearranged time slots, and the rest of the time is allocated to the local area radio transmitter hence avoiding any collisions. Partitioning air time between local area and wide area radio transmitters will provide for a clear local area transmission while providing appropriate time for wide area radio transmitters as well. This eliminates any channel collisions and the need for periodic channel scans by a local area radio transmitter.

The synchronization between local area transmission and wide area transmission maybe based on periodic time slots or can be designed using time slots that are determined using a agreed upon common algorithm across local and wide area radio transmitters.

This synchronized and cooperative radio transmission can be mutually exclusive or can overlap. If overlapping, a wide area radio transmitter may transmit signature signals at certain sub-frequencies in a frequency band such that the local area radio transmitter can override and cancel these signature signals at specified sub-frequencies and still provide a clear transmission. This scheme will enable a radio channel owner to determine which devices are allowed to use its spectrum. All devices that are not certified by a radio channel owner will not be able to cancel the signature signals and hence receive the signature signal as additional noise thus degrading the quality of reception.

DRAWINGS—FIGURES

DRAWINGS—REFERENCE NUMERALS

Figure 1:
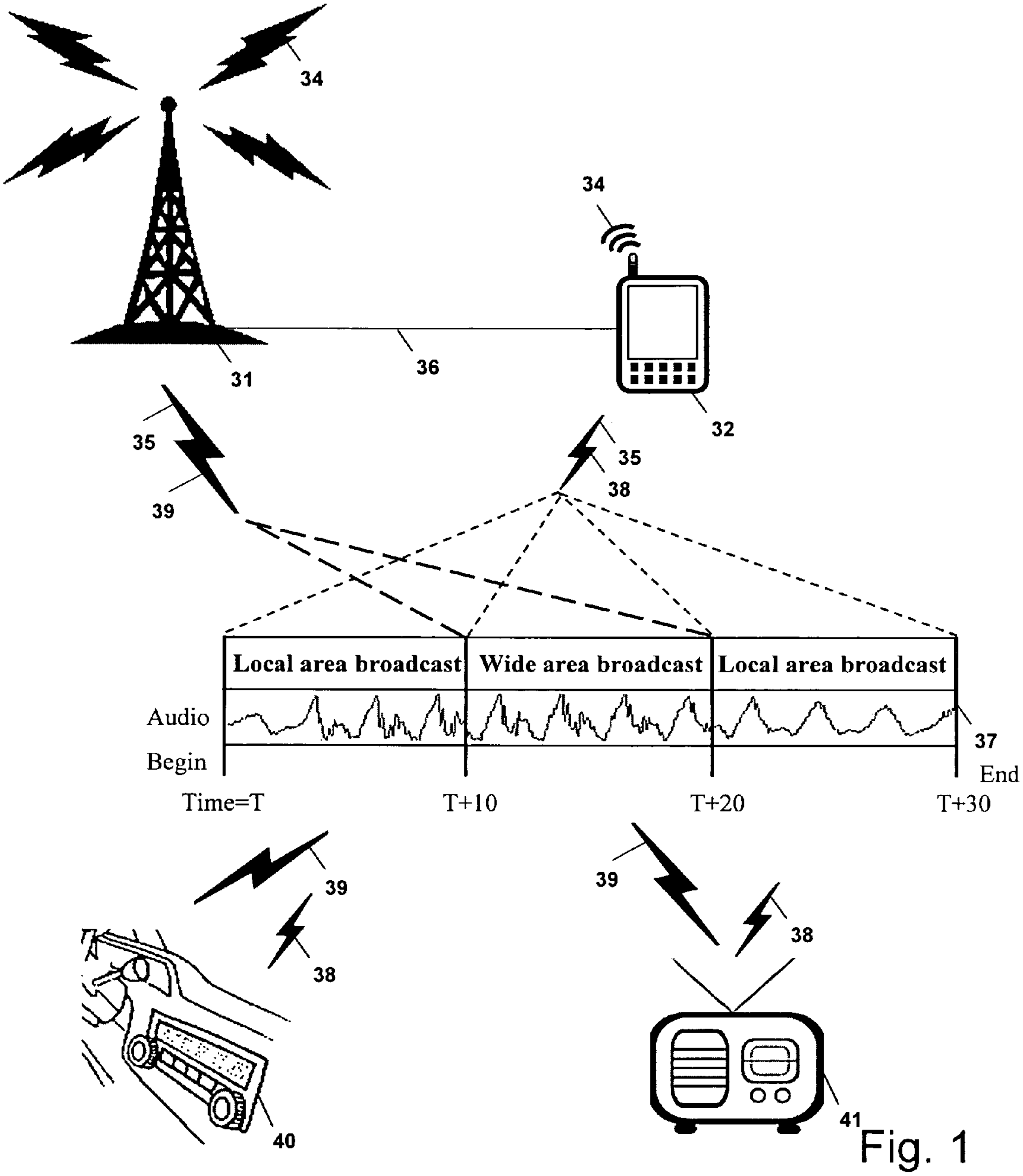
FIG. 1 shows a cooperative radio broadcast system including local area and wide area radio broadcast devices.

31 wide area broadcast station
32 smartphone
33 broadcast mobile device
34 broadcast radio signals
35 desired radio channel
36 coupling algorithms
37 broadcast timeline graph
38 local area broadcast radio signals
39 wide area broadcast radio signals
40 automobile radio receiver
41 other radio receivers
42 signature signals
43 canceling signature signals
44 personal digital assistant
45 mobile phone
46 portable media player
47 analog broadcast radio signals
48 digital broadcast radio signals
49 amplitude modulation standard
50 frequency modulation standard
51 high definition radio standard
52 digital audio broadcast standard
53 smartphone broadcast radio signal transmitter
54 smartphone broadcast transmit antenna
55 smartphone application processor
56 smartphone transmit control module
57 smartphone audio subsystem
58 smartphone random access memory unit
59 smartphone central processing unit
60 smartphone software applications
61 smartphone cellular modem
62 smartphone cellular antenna
63 smartphone power supply
64 digital audio content
65 audio output to be transmitted
66 broadcast radio signal receiver
67 receiver antenna
68 broadcast radio signal transmitter
69 broadcast transmit antenna
70 application processor
71 transmit control module
72 audio subsystem
73 random access memory unit
74 central processing unit
75 software applications
76 power supply
77 digital audio content
78 step
79 step
80 step
81 step
82 step
83 step
84 step
85 step
86 step
87 step
88 step
89 step
90 step
91 step
92 step
93 step
94 step
95 step

96 step
97 step
98 step
99 step

DETAILED DESCRIPTION OF PREFERRED EMBODIMENT

In the following description, first a cooperative radio broadcast system is described, then details of a smartphone mobile device that has the capability to operate in relation to a wide area broadcast station is described. Then the method used for broadcasting in cooperative environment is described.

FIG. 1 shows a cooperative radio broadcast system in which wide area broadcast station 31 is coupled to smartphone 32 which is an embodiment of local area broadcast mobile device 33. Both broadcast station 31 and mobile device 33 use broadcast radio signals 34 to broadcast audio content into desired radio channel 35. Mobile device 33 is coupled to broadcast station 31 using one of several coupling algorithms 36. One such algorithm could be to allocate mutually exclusive time slots so that transmission from mobile device 33 does not overlap transmission from broadcast station 31. Such a transmission is shown using a broadcast timeline graph 37. Timeline graph 37 shows that for configurable amount of time, mobile device 33 transmits local area broadcast radio signals 38 and then broadcast station 31 transmits wide area broadcast radio signals 39 followed by transmission from mobile device 33 again. The amount of broadcast time mobile device 33 or broadcast station 31 is allocated is dependent on the algorithm used. The algorithm can allocate fixed time slots or time slots may be based on an agreed upon pattern between broadcast station 31 and mobile device 33. Although such a system is useful in an automobile radio receiver 40, it is equally applicable to other radio receivers 41 as well. Hence it can be seen that with cooperation of broadcast station, a local area broadcast mobile device 33 can transmit into a common desired channel 35 without any interference from transmission of broadcast station 31.

Figure 2:
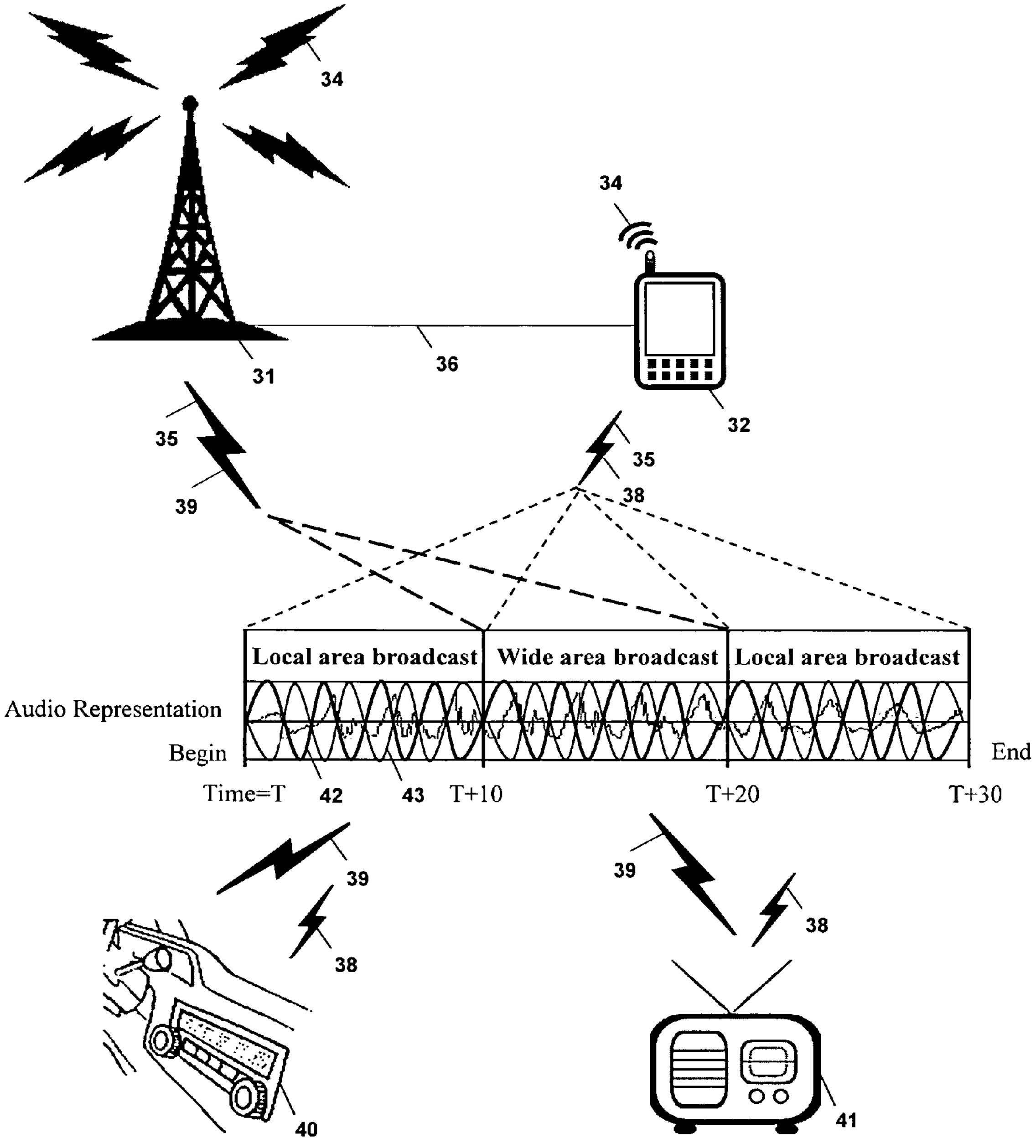
FIG. 2 shows a cooperative radio broadcast system including local area and wide area radio broadcast devices where wide area broadcast station sends a signature signal that is cancelled by local area broadcast device.

FIG. 2 also 'shows a cooperative radio broadcast system as described in above description for FIG. 1, in which wide area broadcast station 31 is coupled to smartphone 32.

Additionally in this scenario, transmission from mobile device 33 can overlap transmissions from broadcast station 31. Broadcast station 31 can transmit signature signals 42 at all durations and if signature signals 42 are transmitted, then mobile device 33 will transmit canceling signature signals 43 to cancel out the effects of signature signals 42. Mobile device 33 may detect the presence of signature signals 42 using an embedded radio receiver. This enables partitioning mobile devices into two categories, one that are certified and compatible with broadcast radio station 31 and other where the devices are not certified or compatible. Certified mobile devices will operate with minimal interference with broadcast radio station, whereas uncertified mobile devices will interfere and hence generate a combined signal that is not as clear as certified mobile devices. This scheme of certifying mobile devices to operate alongside broadcast stations enables radio station operators to maintain control over advertisement revenues while giving consumers the choice of having on demand radio programming.

Figure 3:
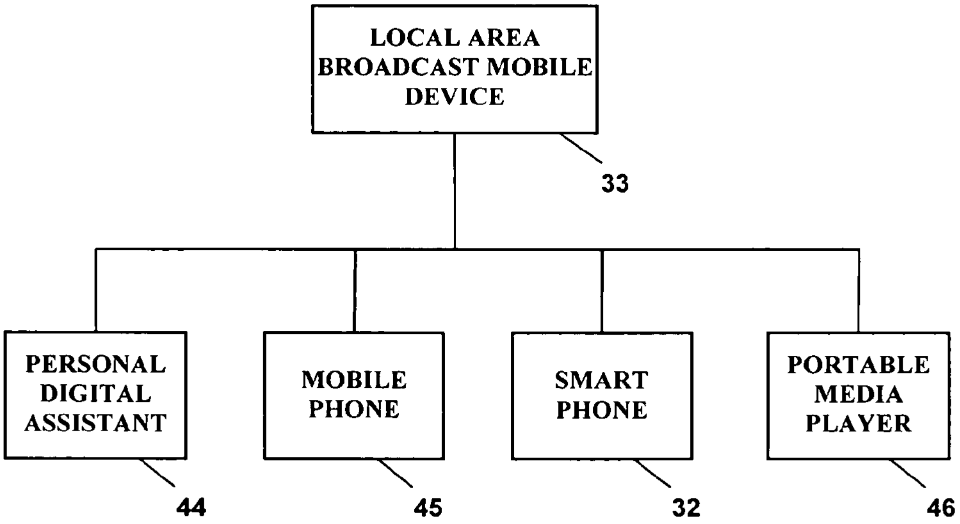
FIG. 3 shows examples of a local area broadcast mobile device.

FIG. 3 shows a local area broadcast mobile device 33 that can be one of personal digital assistant 44, mobile phone 45, smartphone 32 and portable media player 46. Mobile device 33 is capable of transmitting broadcast radio signals 34

Figure 4:
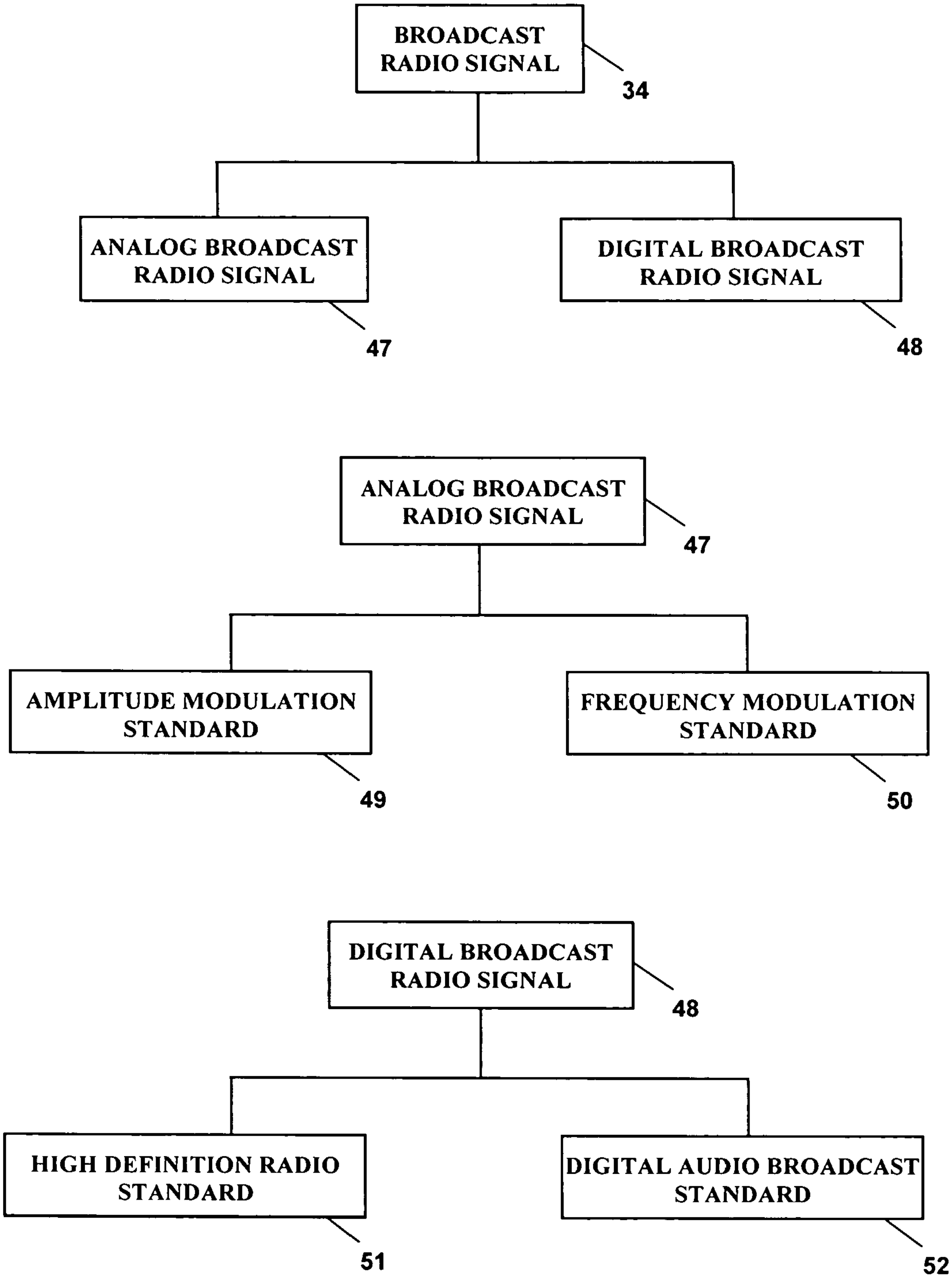
FIG. 4 shows various broadcast signal standards.

FIG. 4 shows that broadcast radio signals 34 can be one of analog broadcast radio signals 47 or digital broadcast radio signals 48. Analog broadcast radio signals 47 are compatible with radio standards like amplitude modulation standard 49 and frequency modulation standard 50. Digital broadcast radio signals 48 are compatible with radio standards like high definition radio standard 51 and digital audio broadcast standard 52.

Figure 5:
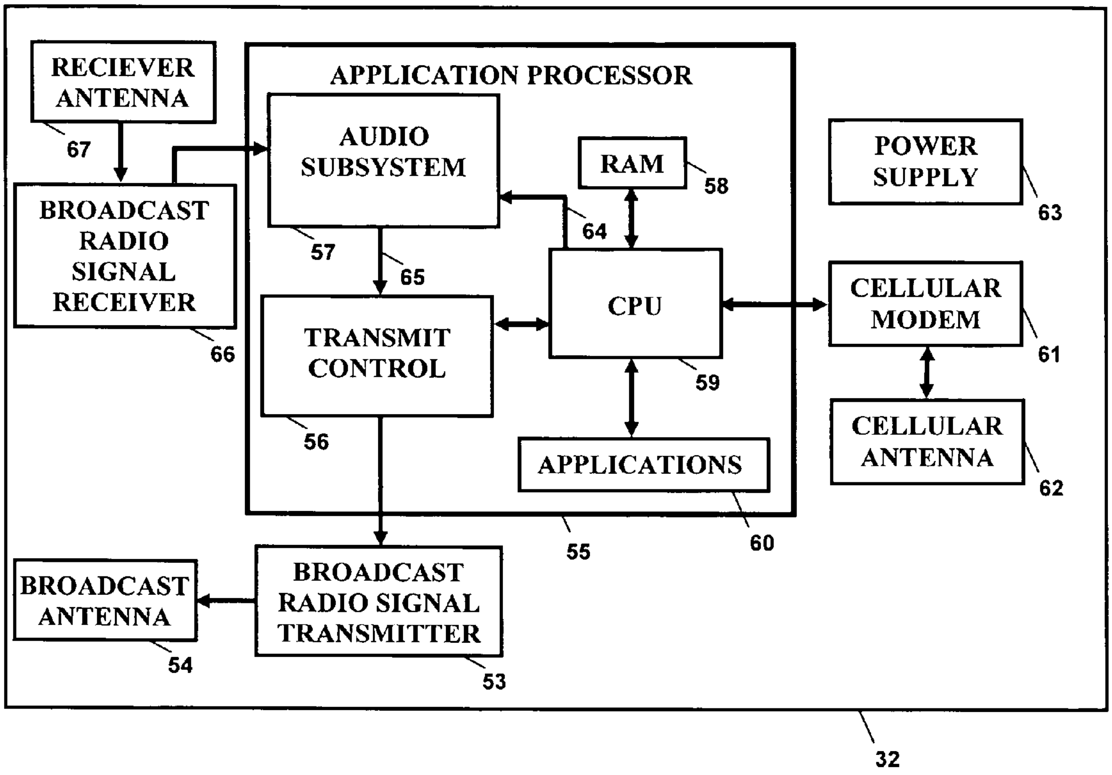
FIG. 5 shows details of a smartphone mobile device capable of local area radio broadcast that can be synchronized with a wide area radio broadcast station.

FIG. 5 shows further details of smartphone 32 used to broadcast radio signals 34 in relation to a wide area broadcast station 31. It is made up of several components including a smartphone broadcast radio signal transmitter 53 coupled to a smartphone broadcast transmit antenna 54.

It also has an smartphone application processor 55 that consists of a smartphone transmit control module 56, a smartphone audio subsystem 57, a smartphone random access memory unit 58, a smartphone central processing unit 59 and set of smartphone software applications 60. Application processor 55 is connected to several components including smartphone broadcast radio signal transmitter 53 and a smartphone cellular modem 61. Smartphone cellular modem 61 is connected to a smartphone cellular antenna 62 that is used to transmit and receive wireless signals over cellular networks. Smartphone 32 is powered by an internal smartphone power supply 63.

Application processor 55 is used to execute smartphone software applications 60 that produce digital audio content 64 consumed by smartphone audio subsystem 57 which outputs audio output to be transmitted 65. Application processor 55 component transmit control module 56 checks if smartphone 32 can transmit at any point in time based on an agreed upon algorithm with broadcast station 31. Smartphone 32 may also have a broadcast radio signal receiver 66 to receive audio signals. Broadcast radio signal receiver 66 is connected to a receiver antenna 67 that enables detection of signature signals 42.

Figure 6:
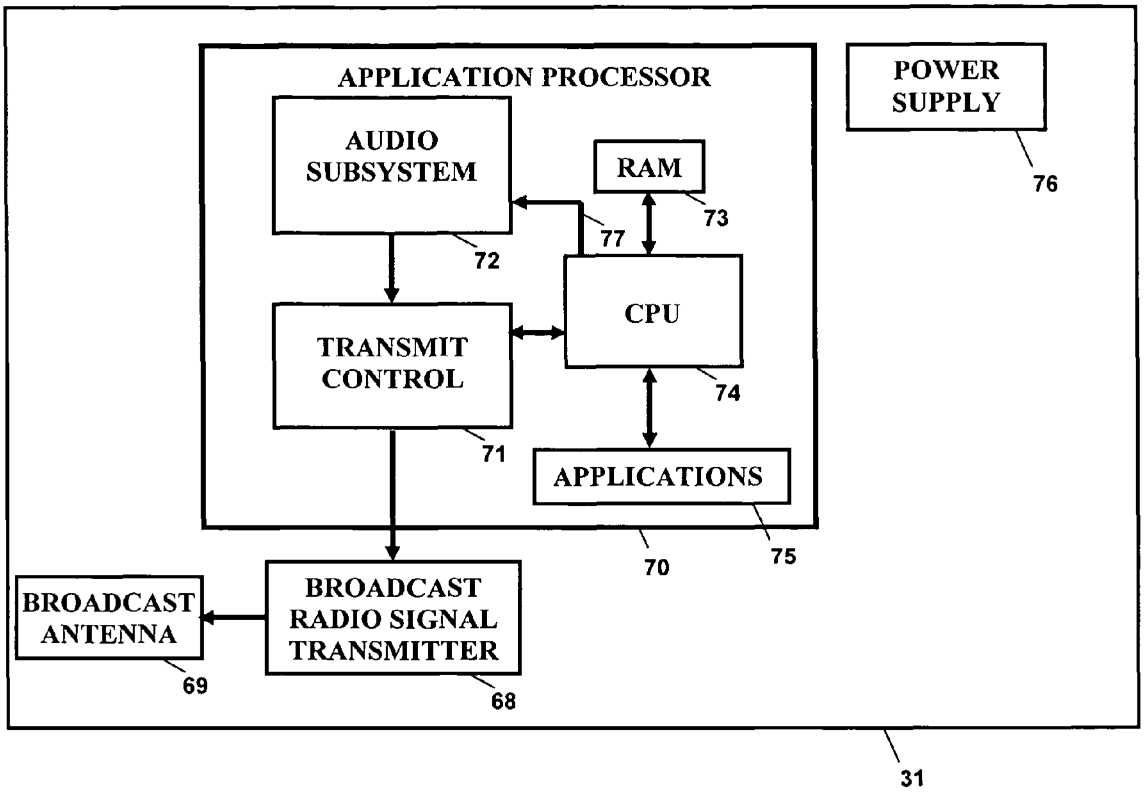
FIG. 6 shows details of a broadcast station used in cooperative broadcast system.

FIG. 6 shows further details of broadcast station 31 used to broadcast radio signals 34 in relation to mobile device 33. It is made up of several components including a broadcast radio signal transmitter 68 coupled to a broadcast transmit antenna 69.

It also has an application processor 70 that consists of a transmit control module 71, a audio subsystem 72, a random access memory unit 73, a central processing unit 74 and set of software applications 75. Application processor 70 is connected to broadcast radio signal transmitter 68. Broadcast station 31 is powered by an internal power supply 76. Application processor 70 is used to execute software applications 75 that produce digital audio content 77 consumed by audio subsystem 72. Application processor 70 component transmit control module 71 checks if broadcast station 31 can transmit at any point in time based on an agreed upon algorithm with mobile device 33.

Figure 7:
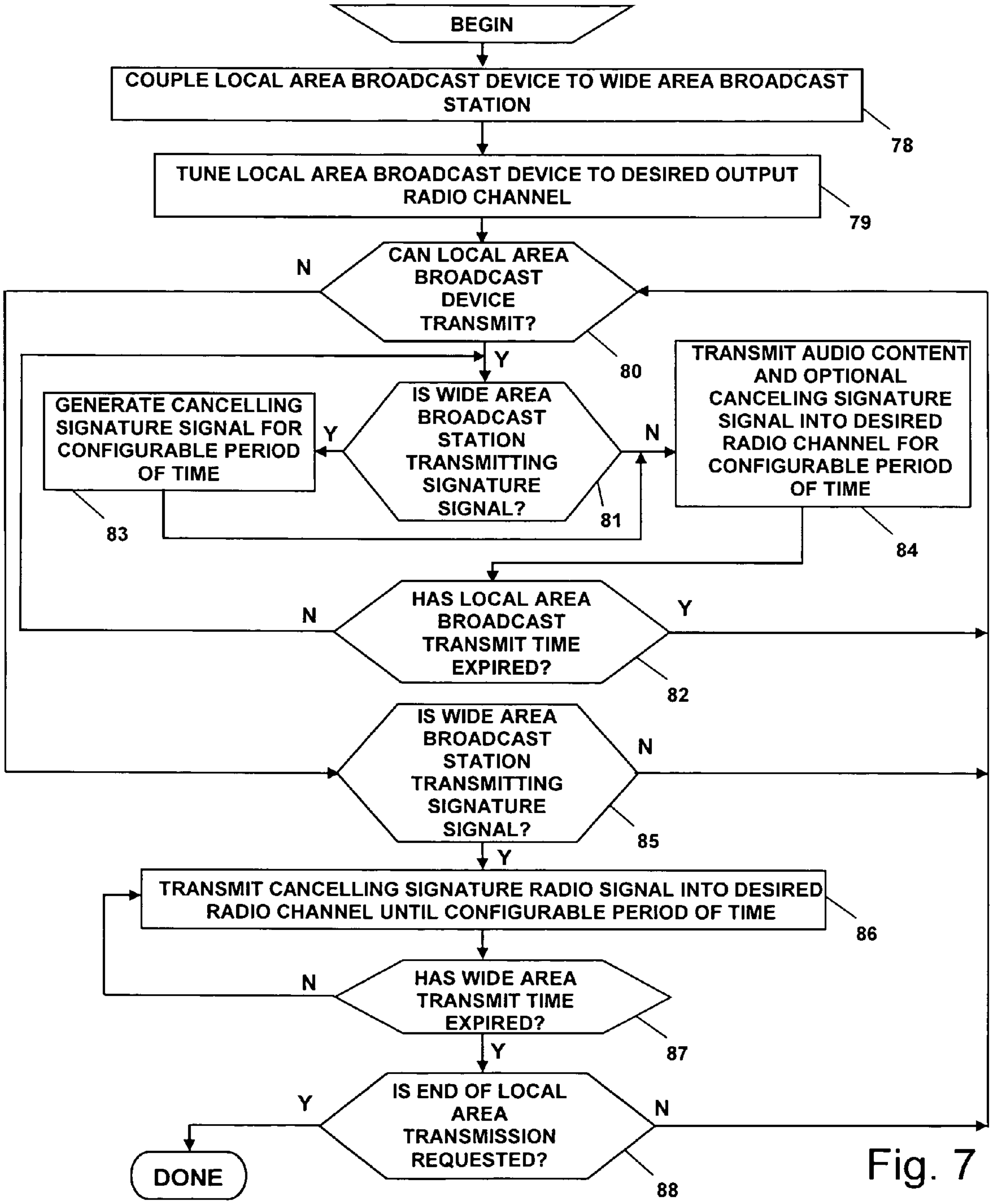
FIG. 7 shows a flow chart of a method executed at mobile device to show how a local area radio transmission is synchronized with a wide area radio broadcast transmitter.

FIG. 7 shows a flow chart of method used in the co-operative radio broadcast system at mobile device 33.

In step 78 local area broadcast mobile device 33 is coupled to wide area broadcast station 31. The coupling algorithm can be based on one of a set of agreed upon algorithms or the algorithm can be determined in real time using some communication means between mobile device 33 and broadcast station 31. This coupling enables mobile device 33 to selectively transmit audio content and/or canceling signature signals 43 using broadcast radio signals 34.

In step 79 mobile device 33 is tuned to a desired radio channel 35 where audio content is to be output, by using smartphone broadcast radio signal transmitter 53.

Then in step 80 a check is made to see if mobile device 33 can transmit any radio signal using mobile device transmit control module 56 in desired radio channel 35. Mobile device transmit control module 56 uses one of several algorithms to determine if mobile device 33 can transmit or not. If transmission is allowed then step 81 is executed. If transmission is not allowed then step 82 is executed.

In step 81 a check is made to see if broadcast station 31 is transmitting signature signal 42. This is detected by the smartphone audio subsystem 57 using broadcast radio signal receiver 66.

In step 83, if signature signal 42 is detected, then canceling signature signal 43 is generated for a configurable period of time to be mixed with audio content that is transmitted.

If signature signal 42 is not detected then audio content is transmitted without mixing with signature signal in step 84. If signature signal 42 is detected and if canceling signature signal 43 is generated then a combination of signal representing audio content and canceling signature signal 43 is transmitted in step 84.

In step 84 canceling signature signal 43 and audio content is modulated into desired radio channel 35 and transmitted using radio signal 34. This transmission is continued until the condition that allows such transmission is valid. After each cycle of transmission that can last a configurable amount time based on coupling algorithms 36, a check is made in step 82 to see if transmit time for mobile device 33 has expired. If transmit time has not expired, transmission is continued by returning back to step 81. If transmit time has expired control is returned to step 80 and the process is repeated.

In step 85 a check is made to determine if a wide area broadcast 31 is transmitting signature signal 42 that is only recognized by certified mobile devices. If such a signal is received at broadcast radio signal receiver 66 then a canceling signal needs to be transmitted so that broadcast signals 34 are clearly received. This is done in next step. If a wide area broadcast 31 is not transmitting signature signal 42, then control is passed back to step 80.

In step 86 mobile device 33 transmits for a configurable period of time, a canceling signature signal 43 to cancel out the effects of signature signal 42 in radio signal 34. This enables receiving radio signal 34 from broadcast station 31 clearly.

In step 87 a check is made to see if wide area transmission time has expired, if this is the case then in step 88 a check is made to see if end of local transmission has been requested. If an end of local transmission is requested, the process of cooperative radio broadcast is ended with reference to mobile device 33. If an end of local transmission is not requested, then the process is repeated from step 80.

Figure 8:
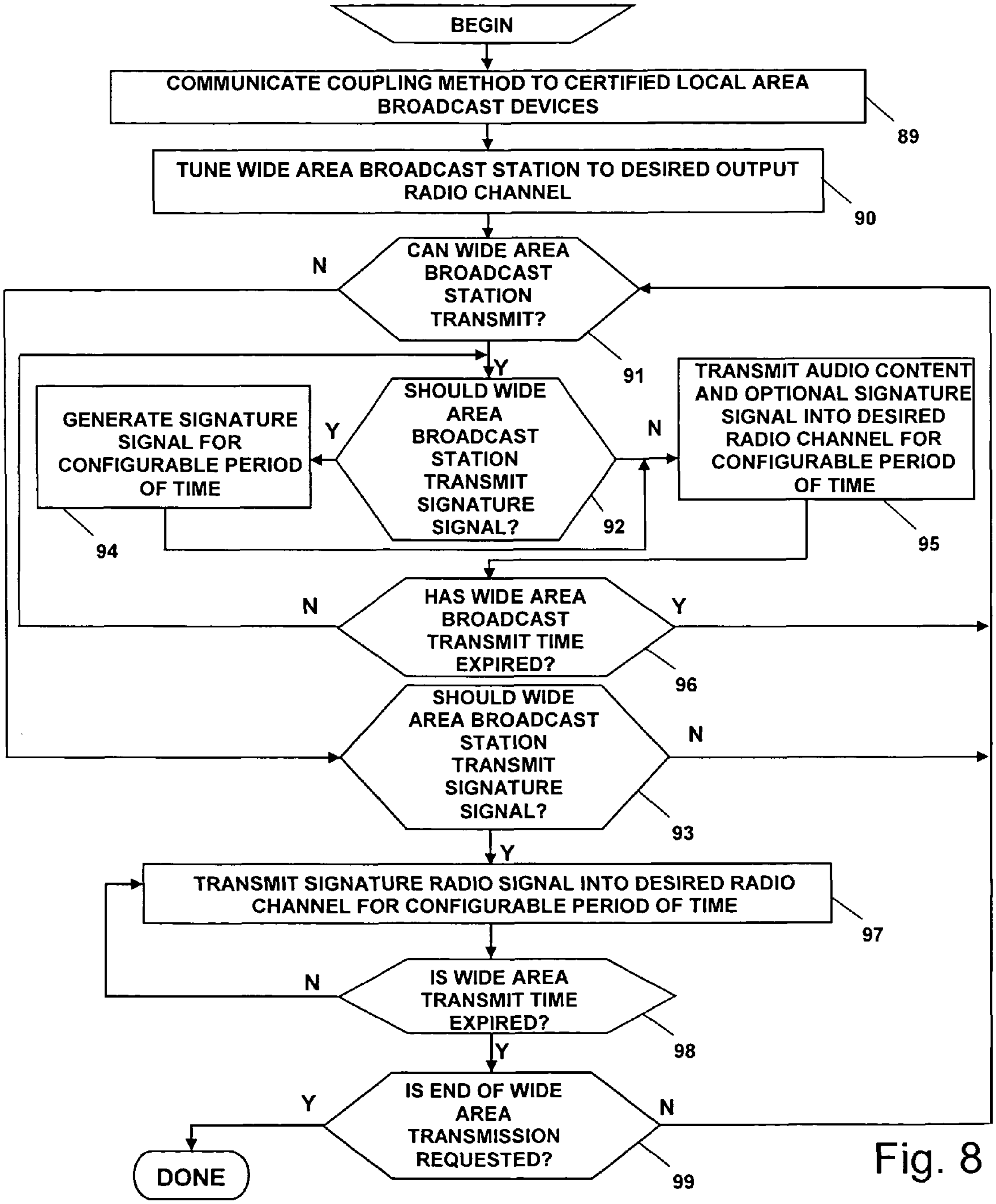
FIG. 8 shows a flow chart of a method executed at broadcast station to show how a wide area radio transmission is synchronized with a local area radio broadcast transmitter.

FIG. 8 shows a flow chart of method used in the cooperative radio broadcast system at broadcast station 31.

In step 89 broadcast station 31 communicates coupling to local area broadcast mobile device 33 if necessary. The coupling algorithm can be based on one of a set of agreed upon algorithms or the algorithm can be determined in real time using some communication means between broadcast station 31 and local area broadcast mobile device 33. This coupling enables broadcast station 31 to selectively transmit audio content and/or signature signals 42 using broadcast radio signals 34.

In step 90 broadcast station 31 is tuned to a desired radio channel 35 where audio content is to be output, by using broadcast radio signal transmitter 68.

Then in step 91 a check is made to see if broadcast station 31 can transmit any radio signal using transmit control module 71 in desired radio channel 35. Transmit control module 71 uses one of several algorithms to determine if broadcast station 31 can transmit or not. If transmission is allowed then step 92 is executed. If transmission is not allowed then step 93 is executed.

In step 92 a check is made to see if broadcast station 31 should transmit signature signal 42.

In step 94 if signature signal 42 is to be transmitted, then signature signal 42 is generated for a configurable period of time to be mixed with audio content that is transmitted.

If signature signal 42 is not to be generated then audio content is transmitted without mixing with signature signal in step 95. If signature signal 42 is generated then a combination of signal representing audio content and signature signal 42 is transmitted in step 95.

In step 95 signature signal 42 and audio content is modulated into desired radio channel 35 and transmitted using radio signal 34. This transmission is continued until the condition that allows such transmission is valid. After each cycle of transmission that can last a configurable amount time based on coupling algorithms 36, a check is made in step 96 to see if transmit time for broadcast station 31 has expired.

If transmit time has not expired, transmission is continued by returning back to step 92. If transmit time has expired control is returned to step 91 and the process is repeated.

In step 93 a check is made to determine if a wide area broadcast 31 should transmit signature signal 42 that is only recognized by certified mobile devices. If it is needed then corresponding actions are taken in next step. If a wide area broadcast 31 is not transmitting signature signal 42, then control is passed back to step 91.

In step 97 broadcast station 31 transmits a signature signal 42 so that only certified mobile devices can recognize and cancel out the signature signals.

In step 98 a check is made to see if wide area transmission time has expired. If this is the case, then in step 99 a check is made to see if end of wide area transmission has been requested. If an end of wide area transmission is requested, the process of cooperative radio broadcast is ended with reference to desired radio channel 35. If an end of wide area transmission is not requested, then the process is repeated from step 91.

Advantages

From the description above a number of advantages of this interactive radio system become evident:

a) a clear collision free personalized audio listening experience in an automobile is provided;

b) a method that enables radio channel owners to maintain advertisement revenue while providing personalized audio listening experience is provided; and c) additional revenue opportunities to radio channel owners are provided while providing for a personalized audio listening experience.

Conclusion, Ramifications and Scope

Accordingly, the reader will see that enabling a local area radio transmission device to transmit in a cooperative manner with a wide area transmission device is the best solution to provide a clear collision free personalized audio listening experience in an automobile.

Although the description above contains many specificities, these should not be construed as limiting the scope of invention but merely as providing illustrations of some of the presently preferred embodiments of this invention. Thus the scope of this invention should be determined by appended claims and their legal equivalents, rather than by example given.

We claim:

1. A method of providing local area radio broadcast transmission in a radio broadcast channel comprising:

transmitting a radio signal using a local area radio broadcast transmitting device to transmit audio content into said radio broadcast channel, such that said radio transmission from said local area radio broadcast transmitting device is coupled to radio transmissions of a wide area radio broadcast transmitting device corresponding to said radio broadcast channel; wherein said coupling between said local area radio broadcast transmitting device and said wide area radio broadcast transmitting device is associated with time allocation methods selected from group consisting of time allocation method that provides mutually exclusive transmission time slots and time allocation method that provides overlapping transmission time slots.

2. The method of providing local area radio broadcast transmission of claim 1, wherein said local area radio broadcast transmitting device is selected from group consisting of portable media player device, mobile phone device, smartphone device, netbook computer device, laptop computer device, personal digital assistant device, and consumer electronics accessory device capable of said radio broadcasting.

3. The method of providing local area radio broadcast transmission of claim 1, wherein said wide area radio broadcast is selected from group consisting satellite radio broadcast and terrestrial radio broadcast.

4. The method of providing local area radio broadcast transmission of claim 1, wherein said radio broadcast channel uses modulation schemes selected from group consisting of amplitude modulation, frequency modulation, spread spectrum modulation, frequency hopping spread spectrum modulation, and orthogonal frequency spread spectrum modulation.

5. The method of providing local area radio broadcast transmission of claim 1, wherein said radio broadcast channel uses audio encoding schemes selected from group consisting of analog audio encoding and digital audio encoding.

6. A device providing local area radio broadcast transmission in a radio broadcast channel comprising:

a local radio broadcast transmitter module to transmit low power radio signals into a radio broadcast channel; and a coupler module to couple said low power transmission with transmission from a wide area radio broadcast transmitting device;

wherein said coupling between said local area radio broadcast transmitting device and said wide area radio broadcast transmitting device is associated with time allocation methods selected from group consisting of time allocation method that provides mutually exclusive transmission time slots and time allocation method that provides overlapping transmission time slots.

7. The device providing local area radio broadcast transmission of claim 1, wherein said local area radio broadcast transmitting device is selected from group consisting of portable media player device, mobile phone device, smartphone device, netbook computer device, laptop computer device, personal digital assistant device, and consumer electronics accessory device capable of said local area radio broadcast transmission.

8. The device providing local area radio broadcast transmission of claim 1, wherein said wide area radio broadcast is selected from group consisting satellite radio broadcast and terrestrial radio broadcast.

9. The device providing local area radio broadcast transmission of claim 1, wherein said radio broadcast channel uses modulation schemes selected from group consisting of amplitude modulation, frequency modulation, spread spectrum modulation, frequency hopping spread spectrum modulation, and orthogonal frequency spread spectrum modulation.

10. The device providing local area radio broadcast transmission of claim 1, wherein said radio broadcast channel uses audio encoding schemes selected from group consisting of analog audio encoding and digital audio encoding.

* * * * *